US006323760B1

(12) United States Patent
Sasanouchi et al.

(10) Patent No.: US 6,323,760 B1
(45) Date of Patent: Nov. 27, 2001

(54) COLUMN COMBINATION SWITCH FOR AUTOMOBILE

(75) Inventors: Kiyotaka Sasanouchi, Kadoma; Susumu Nishimoto, Tenri; Kouji Oike, Nishinomiya; Makoto Inoue, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,619

(22) PCT Filed: Jun. 11, 1999

(86) PCT No.: PCT/JP99/03150

§ 371 Date: May 8, 2000

§ 102(e) Date: May 8, 2000

(87) PCT Pub. No.: WO99/42301

PCT Pub. Date: Aug. 26, 1999

(30) Foreign Application Priority Data

Jun. 16, 1998 (JP) .................................................. 10-167874

(51) Int. Cl.[7] ...................................................... B60R 25/10

(52) U.S. Cl. .......................... 340/426; 340/425; 340/430; 340/439; 340/457

(58) Field of Search .................................... 340/426, 457, 340/425.5, 539, 430, 825.31, 825.69

(56) References Cited

U.S. PATENT DOCUMENTS

| | | | | |
|---|---|---|---|---|
| 4,383,242 | * | 5/1983 | Sassover et al. | 340/64 |
| 4,973,958 | * | 11/1990 | Hirano et al. | 340/825.69 |
| 5,040,168 | * | 8/1991 | Maue et al. | 340/425.5 |
| 5,677,665 | * | 10/1997 | Amano et al. | 340/426 |
| 5,896,094 | * | 4/1999 | Narisada et al. | 340/825.31 |
| 5,942,985 | * | 8/1999 | Chin | 340/825.31 |

FOREIGN PATENT DOCUMENTS

| | | |
|---|---|---|
| 4-362898 | 12/1992 | (JP) . |
| 7-312513 | 11/1995 | (JP) . |
| 8-199885 | 8/1996 | (JP) . |
| 9-112102 | 7/1997 | (JP) . |
| 9-207717 | 8/1997 | (JP) . |
| 10-157534 | 6/1998 | (JP) . |

* cited by examiner

*Primary Examiner*—Jeffery Hofsass
*Assistant Examiner*—Hung Nguyen
(74) *Attorney, Agent, or Firm*—McDermott, Will & Emery

(57) ABSTRACT

The invention is intended to extend the receiving distance in a remote keyless entry system for automobile, and minimize the direction limitations. To achieve the object, the invention comprises a column combination switch main body (1) having a light control switch unit (2) and a wiper control switch unit (3), and also includes receiving means for receiving signals from a transmitter main body (12) of a remote keyless entry system, thereby constituting a column combination switch for automobile incorporating a remote key less entry system wide in the receiving range.

18 Claims, 7 Drawing Sheets

COLUMN COMBINATION SWITCH FOR AUTOMOBILE

TECHNICAL FIELD

The present invention relates to a column combination switch for automobile installed in a steering column of an automobile.

BACKGROUND ART

A prior art is described while referring to FIG. 6 to FIG. 8. FIG. 6 is a block diagram of a conventional column combination switch for automobile. Reference numeral 19 is a column combination switch main body, and reference numeral 20 is a light control switch unit, in which various switches are incorporated including the light switch, dimmer-passing switch, and turn switch. Reference numeral 21 is a wiper control switch unit, which accommodates various switches relating to the wiper including the front and rear wiper switches and washer switch. Reference numeral 22 is control means. Reference numeral 23 is a connector for communicating between the column combination switch and external devices by signals, and these signal communications are realized by a multiplex transmission system.

FIG. 7 and FIG. 8 are system diagrams of remote keyless entry system. In FIG. 7, reference numeral 12 is a transmitter main body of remote keyless entry system, reference numeral 13 is a signal generator for generating an aerial propagation signal, reference numeral 14 is a memory unit storing specific information, reference numeral 15 is a power source of the transmitter main body 12, reference numeral 16 is a transmission circuit for converting the output electric signal from the signal generator 13 into a radio signal and transmitting, and reference numeral 17 is a operation switch of the transmitter main body 12. Reference numeral 24 is a receiver main body, 25 is a power source unit, reference numeral 26 is a memory unit storing specific signals, reference numeral 27 is a comparator for comparing with received specified information, reference numeral 28 is control means, and reference numeral 29 is a receiving unit, which is connected to the control means 28. The receiving unit 29 of the receiver main body 24 is accommodated in the door of an automobile main body 31 as shown in FIG. 8, and a controller 30 for locking and unlocking the door is also incorporated in the door.

In this conventional system, the mutual relation of constituent elements and operation are described below. When the switch units 20, 21 of the column combination switch are manipulated, signals showing switch positions of the switch units 20, 21 are put into the control means 22, and the control means 22 processes these signals, and communicates with the external system through the connector 23. On the other hand, in the remote keyless entry system, by pushing the operation switch 17 of the transmitter main body 12 side, the signal generator 13 issues information of the memory 14, and transmits the information specified by the transmission circuit 16. In the receiver main body 24, specified information is received in the receiving unit 29, and the processed signal is compared with the specified information stored in the memory unit 26 in the control means 28 by the comparator 27, and when the both are matched, a door lock or unlock signal is issued to the controller 30, so that the vehicle door is locked or unlocked.

That is, without having to insert the key into the keyhole in the door, the specified information is transmitted from the transmitter main body 12, and compared with the specified information stored in the receiver main body 24 at the vehicle side, and when the both are matched, the door is locked or unlocked. When attempted to lock or unlock the door by inserting the key into the keyhole in the door, if carrying something in both hands or in the nighttime, it is hard to insert the key smoothly into the keyhole in the door, and it takes much time, or the vehicle may be scratched by the edge of the key. Instead of the key, by transmitting the specified information from the transmitter main body 12 to the receiver main body 24 at the vehicle side, the door is locked or unlocked. Therefore, by transmitting specified information from the transmitter main body 12, and comparing the specified information received in the receiver main body 24 and the specified information stored in the memory unit by an electronic circuit, the door can be locked or unlocked. This system may be also applied in various control devices, such as the trunk room lid locking and unlocking device, windowpane opening and closing device, or engine starting device.

Thus, in the remote keyless entry system, the signal from the transmitter main body 12 is received by the receiving unit 29 built in the door, and the door is locked or unlocked by comparing process, but since the receiving unit 29 in the door is surrounded by metal panels, which makes it hard to receive radio waves, and in the signal receiving range, the distance from the receiving unit 29 is short, and the receiving direction is also limited.

SUMMARY OF THE INVENTION

To solve the problems, the column combination switch for automobile of the invention is comprised by integrating the receiving means of the remote keyless entry system. In this constitution, by integrating the receiving device of the remote keyless entry system in the column combination switch, the transmission signal of the remote keyless entry system transmitted from outside of the automobile is hardly blocked, and the receiving distance is longer, and the direction limitation is also reduced.

BEST MODE FOR CARRYING OUT THE INVENTION

Embodiment 1

Embodiment 1 of the invention is described below while referring to FIG. 1 to FIG. 5.

Figure 1:
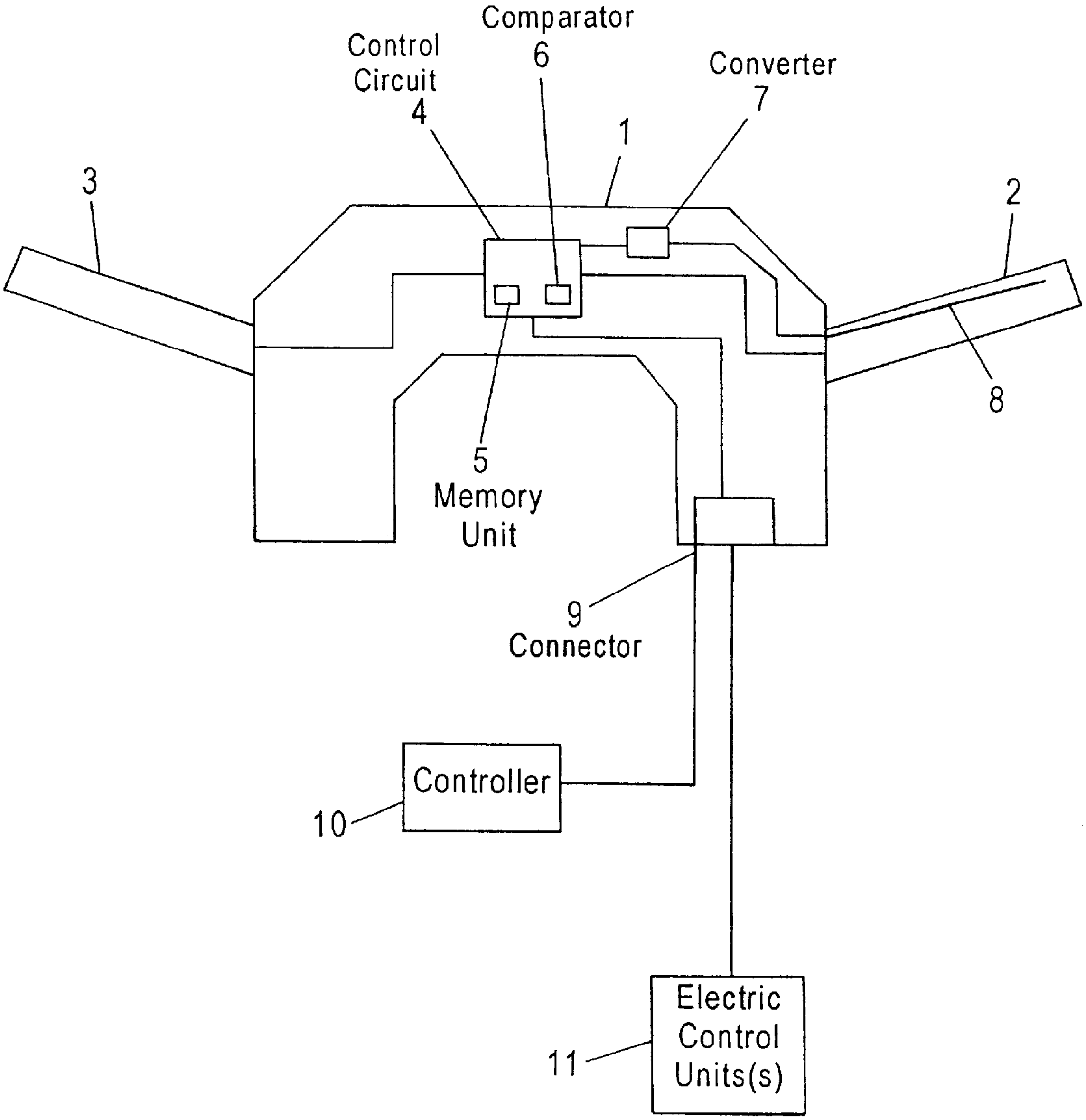
FIG. 1 is a block diagram showing a constitution of a column combination switch for automobile integrating a remote keyless entry system in embodiment 1 of the invention.
Figure 2:
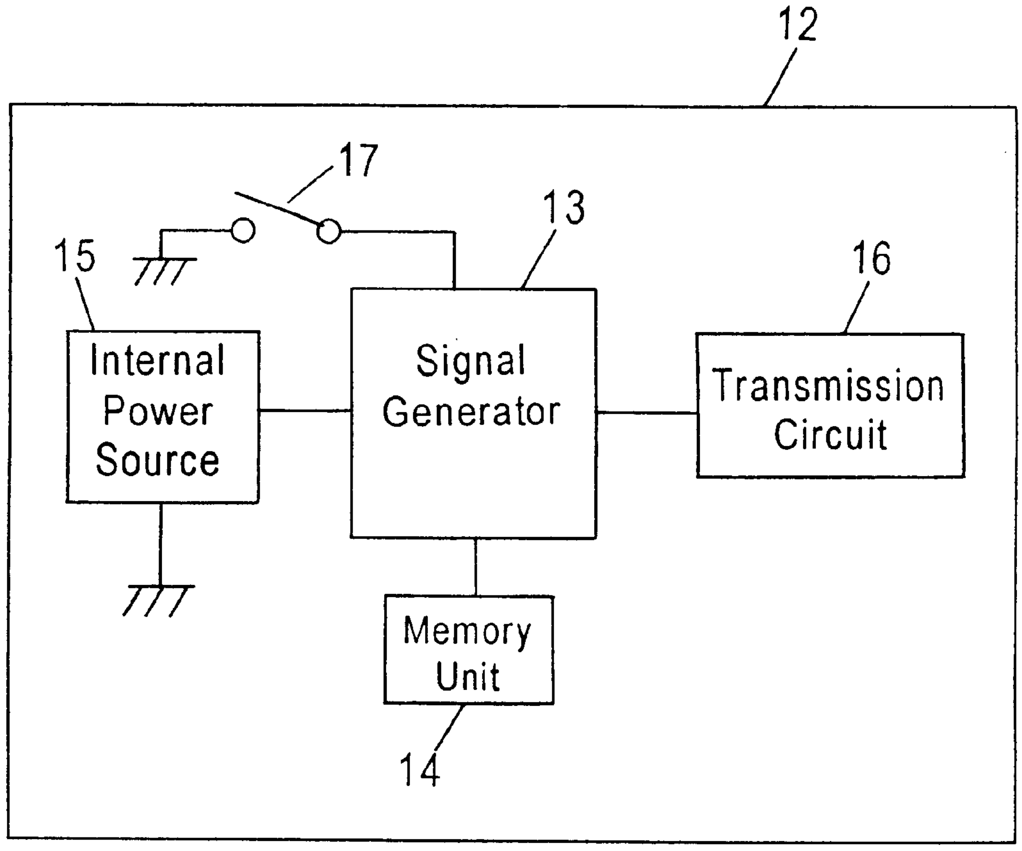
FIG. 2 is a block diagram showing a constitution of a transmitter of the remote keyless entry system used in the column combination switch for automobile.
Figure 3:
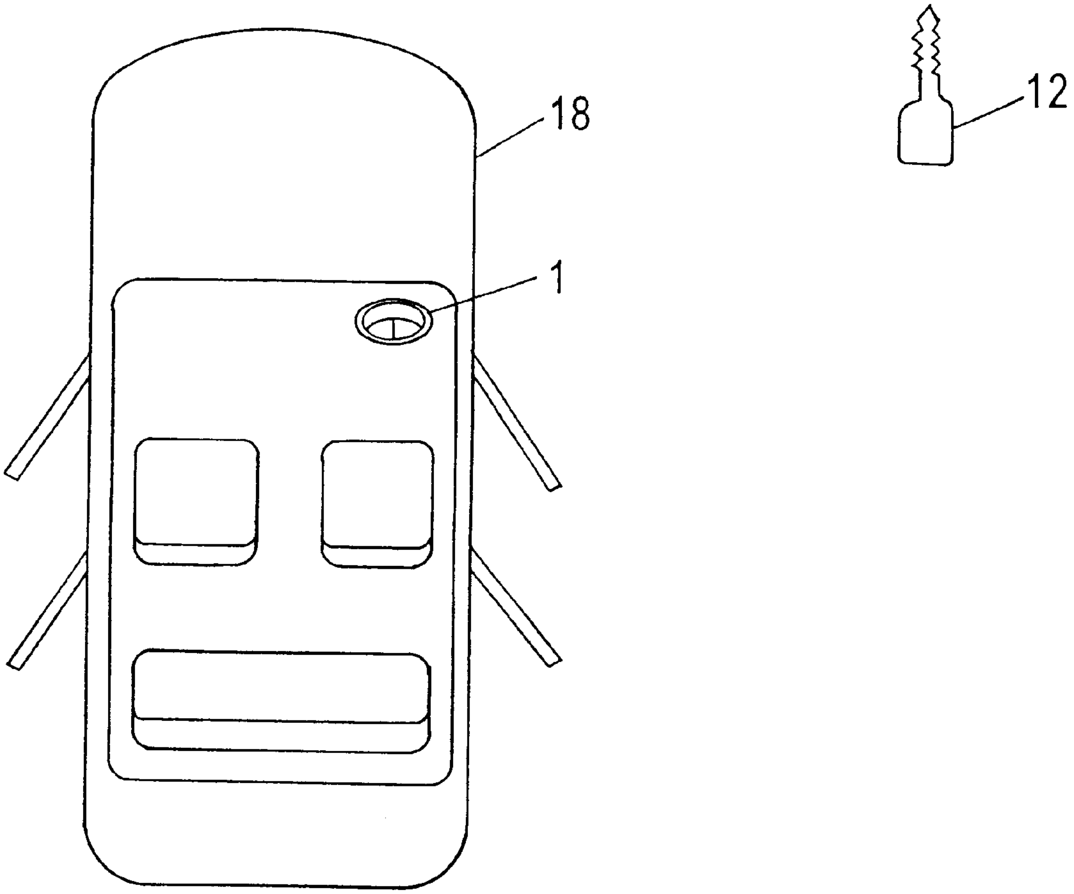
FIG. 3 is a configuration diagram of the column combination switch for automobile in an automobile.
Figure 4:
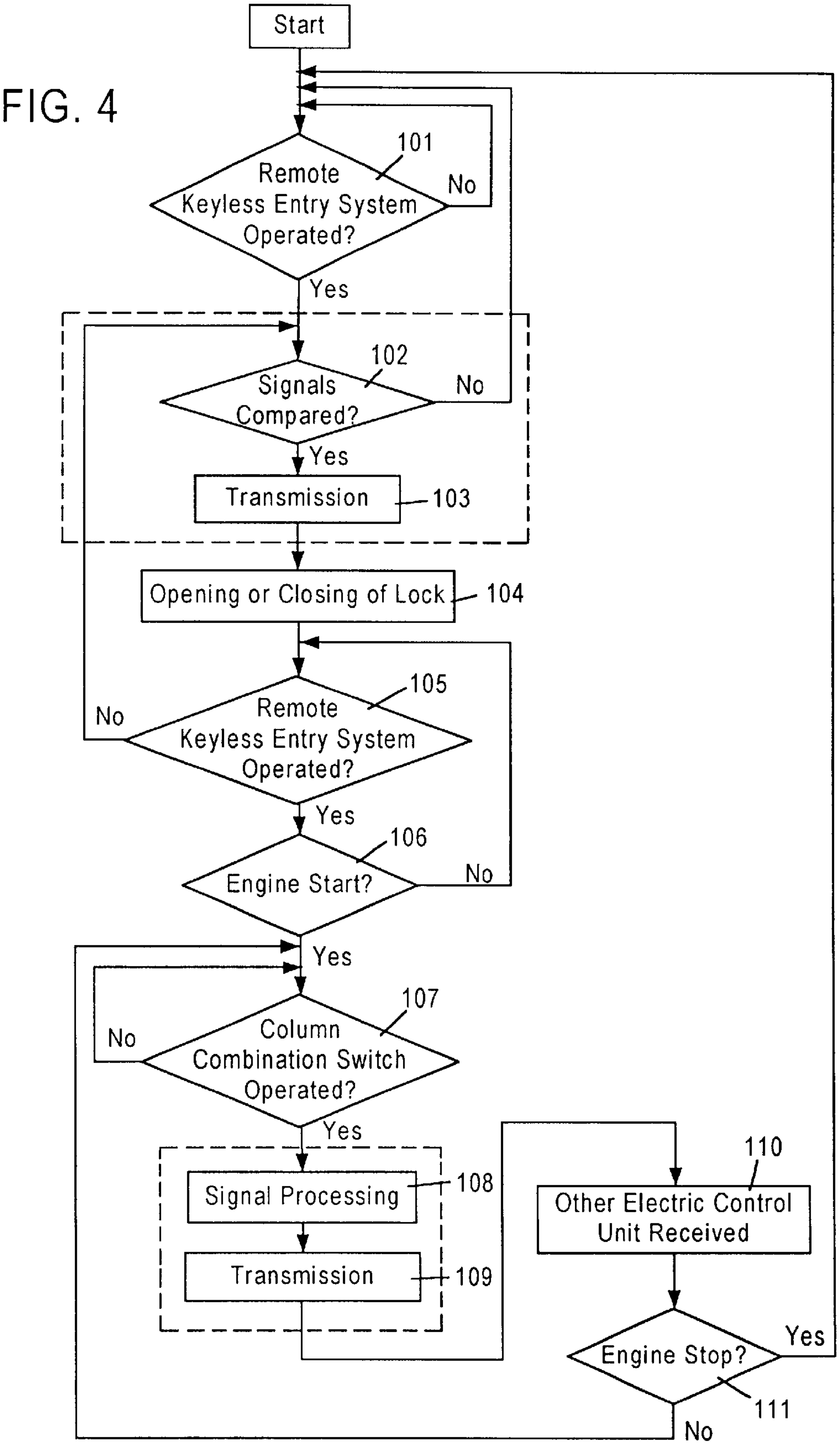
FIG. 4 is a flowchart showing an operating state of the column combination switch for automobile.

FIG. 1 is a block diagram showing a constitution of a column combination switch and a remote keyless entry system in embodiment 1 of the invention, FIG. 2 is a block diagram showing a constitution of a transmitter of the remote keyless entry system, and FIG. 3 is a configuration diagram of the remote keyless entry system and column combination switch in an automobile. FIG. 4 is a flowchart showing the operation from getting on to getting off the car of the driver and the operating state of the microcomputer.

In FIG. 1 to FIG. 3, reference numeral 1 is a column combination switch main body, reference numeral 2 is a light control switch unit, reference numeral 3 is a wiper control switch unit, reference numeral 4 is a control circuit connected to the light control switch unit 2 and wiper control switch unit 3, reference numeral 5 is a memory unit for storing specific information for distinguishing the signal from the transmitter main body of the remote keyless entry system inside the control circuit 4, reference numeral 6 is a comparator for comparing the signal of the remote keyless entry system and the information of the memory unit 5 in the control circuit 4, reference numeral 7 is a converter for converting the radio signal received in the control circuit 4 into an electric signal and issuing, reference numeral 8 is a receiving antenna of radio signal of the remote keyless entry system disposed in the light control switch unit 2, reference numeral 9 is a connector for connecting the control circuit 4 and other electric control unit, reference numeral 10 is a controller for opening or closing the lock of the remote keyless entry system connected to the control circuit 4 through a connector 9, and reference numeral 11 is other electric control unit connected to the control circuit 4 through the connector 9. In FIG. 2, reference numeral 12 is a transmitter main body of the remote keyless entry system, reference numeral 13 is a signal generator, reference numeral 14 is a memory unit for storing specific information of the transmitter main body 12, reference numeral 15 is an internal power source of the transmitter main body 12, reference numeral 16 is a transmission circuit for converting the output electric signal of the signal generator 13 into a radio signal and transmitting, and reference numeral 17 is an operation switch of the transmitter main body 12. In FIG. 3, reference numeral 18 is an automobile main body, which has the column combination switch main body 1 accommodating the receiver of the remote keyless entry system.

The operation is described below while referring to FIG. 1 to FIG. 4.

When manipulating the transmitter main body 12 of the remote keyless entry system from outside of the automobile, a characteristic radio signal is transmitted to its transmitter from the signal generator 13 and memory unit 14 of the transmitter main body 12. When this signal is received by the receiving antenna 8, the signal is converted into an electric signal in the converter 7, and is transmitted to the microcomputer of the control circuit 4 in the column combination switch main body 1. The microcomputer compares this signal with the information of the memory unit 5 in the comparator 6, and when they are matched, a signal for opening or closing the lock is transmitted to the controller 10, and the operation for locking or unlocking is executed. Or when manipulating the wiper control switch unit 3 and light control switch unit 2 of the column combination switch main body 1, the signal is put into the microcomputer and processed, and transferred to other electric control unit 11. In the operation of the remote keyless entry system, by disposing the receiving antenna 8 in the column combination switch main body 1, as compared with the case of disposing at the door inner side as seen from the outside of the automobile, disturbance of the signal by the automobile itself is decreased, and the signal receiving range is widened.

FIG. 4 is a flowchart showing the operation from getting on to getting off the car of the driver and the operating state of the microcomputer.

Suppose the switch 17 of the transmitter main body 12 of the remote keyless entry system is manipulated, then the specific information transmitted from the transmitting circuit 16 is put into the microcomputer in the control circuit 4 through the receiving antenna 8 and converter 7. At this time, the microcomputer judges if the remote keyless entry system has been manipulated or not at step 101, and when judged to be manipulated, the specific information is compared at step 102, and when judged to be matched, at next step 103, a signal is transmitted to the controller 10, and the control for opening or closing the lock is executed at step 104. If judged that the remote keyless entry system is not manipulated at step 101, or when the result of comparison of the specific information at step 102 is judged not to be matched, the process returns to the start step, and the same steps are executed repeatedly.

After the opening and closing control of the lock, at step 105, it is judged if the remote keyless entry system is manipulated or not, and if judged to be manipulated, at step 106, start control of the engine is executed, and its status is judged. If judged that the engine is not started at step 106, the process returns to step 105, and the same steps are executed repeatedly.

At step 106 of start control of the engine, if engine start is judged, at step 107, it is judged if the column combination switch has been manipulated or not, and when judged to be manipulated, at next step 108, the signal of each switch is processed, and the signal is transmitted at step 109, and the process for controlling the other electric control unit 11 is executed at step 110. Advancing to next step 111, judging the operating status of the engine, when the engine is working, the process returns to step 107, and the above steps are executed repeatedly. At step 111, if it is judged that the engine has been stopped, the process returns to start step, thereby waiting for the process of the above steps.

Herein, in this column combination switch for automobile in embodiment 1, what is really processed by the microcomputer is the comparison of the remote keyless entry system enclosed by dotted line, steps 102 and 103 of transmission, signal processing of column combination switch, and steps 108 and 109 of transmission, and from start till stop of engine, it is the state of waiting for input of signal of remote keyless entry system. Thus, the time of signal processing of the remote keyless entry system and the time of signal processing of the column combination switch are not overlaid, and separation of microcomputer processing is easy, and there is no problem in processing speed. Moreover, when the receiver main body of remote keyless entry system is assembled with the column combination switch, the wiring may be curtailed substantially as compared with the prior art. Further, the power consumption may be saved by adding means for judging the entry of the key into the key cylinder for engine start, and starting and stopping input waiting of the remote keyless entry system at that moment.

Figure 5:
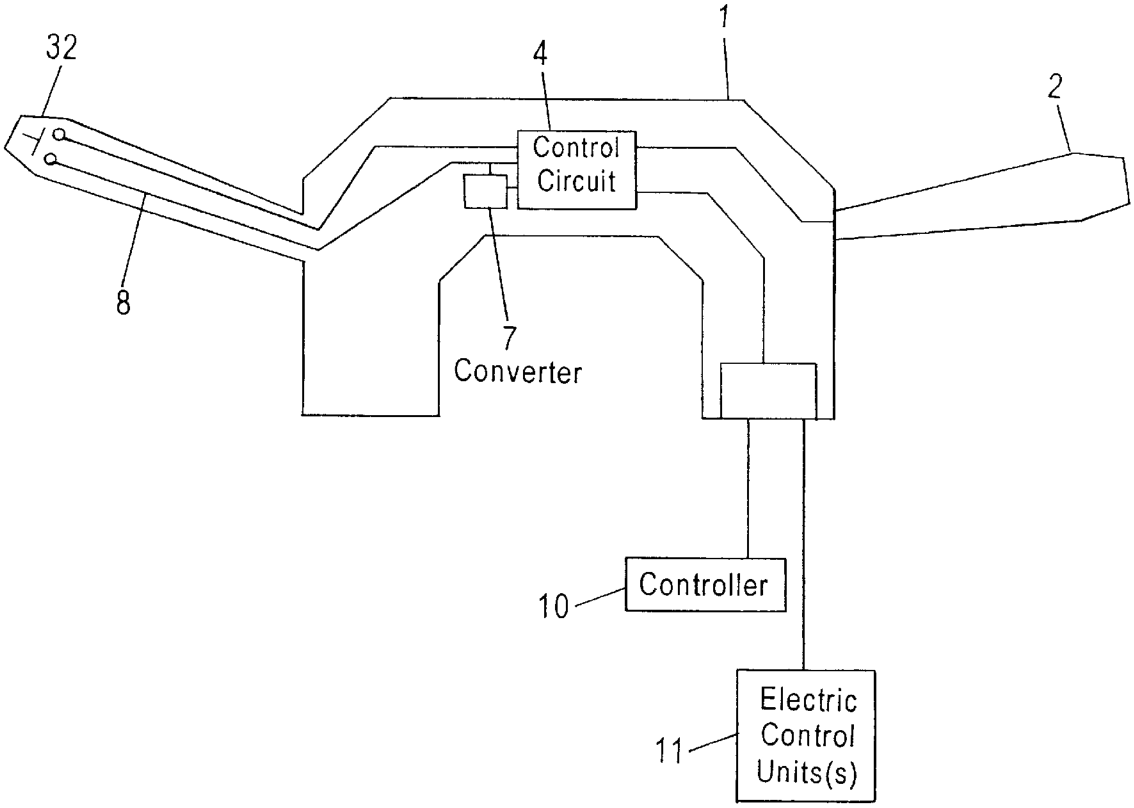
FIG. 5 is an antenna layout example of the column combination switch for automobile.
Figure 6:
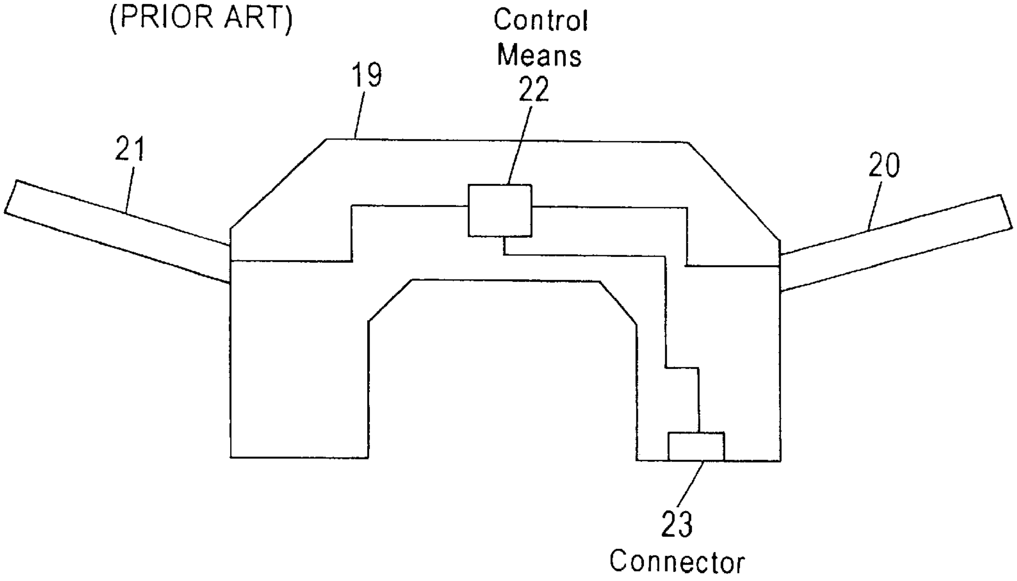
FIG. 6 (PRIOR ART)
FIG. 6 is a block diagram showing a constitution of a conventional column combination switch.
Figure 7:
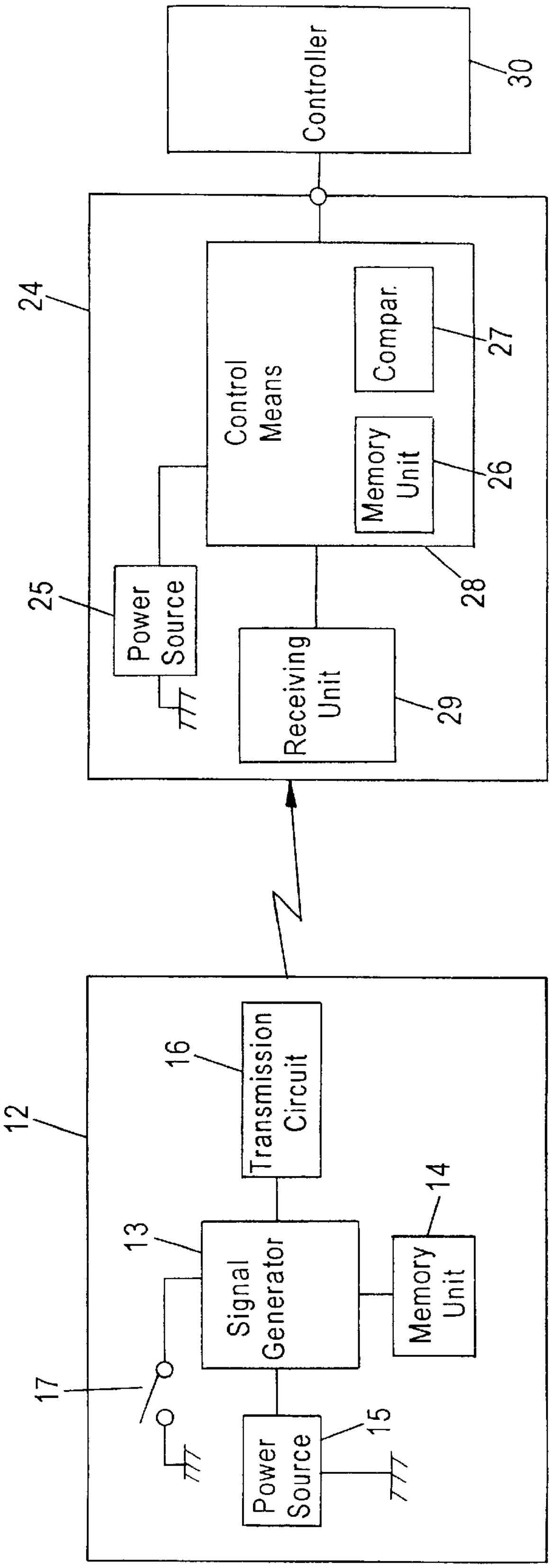
FIG. 7 (PRIOR ART)
FIG. 7 is a system block diagram showing a constitution of a conventional remote keyless entry system.
Figure 8:
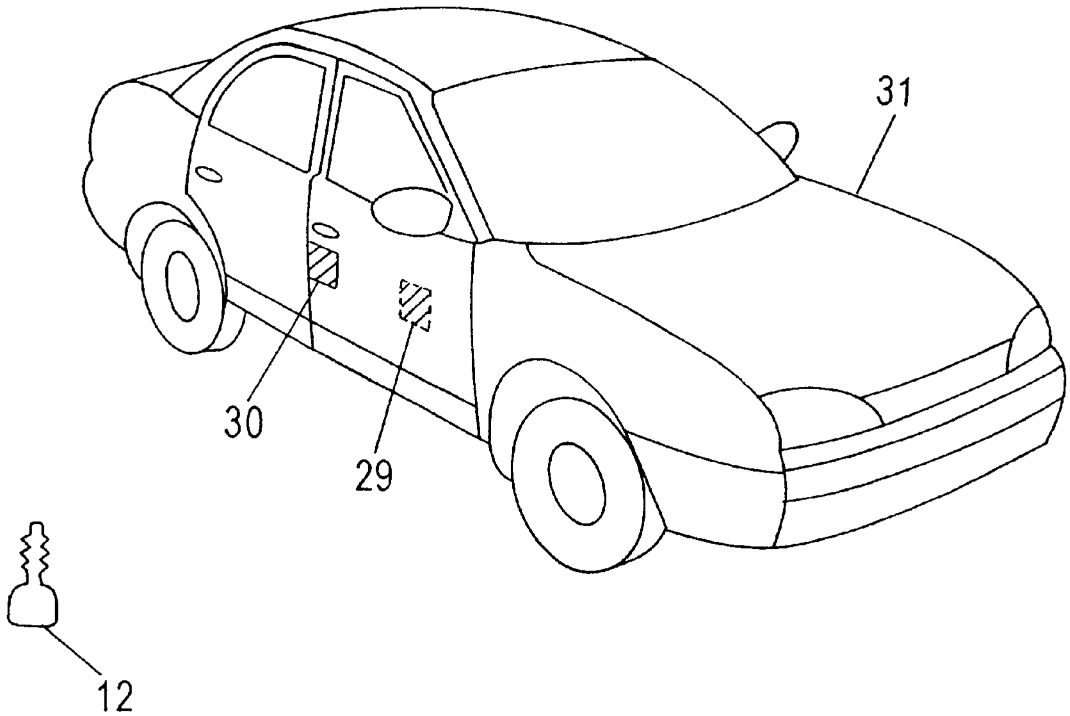
FIG. 8 (PRIOR ART)
FIG. 8 is a configuration diagram of a conventional remote keyless entry system and column combination switch in an automobile.

As for the configuration of the receiving antenna 8, in the case of the length of light control switch unit 2 of about 20 cm and the reception frequency used in the remote keyless entry system of around 310 MHz, supposing to compose a receiving antenna of ¼ λ, its length is about 24 cm, which is nearly same as the length of the switch unit 2, so that the antenna may be installed in an ideal shape. Or when the receiving antenna 8 is disposed in the wiper control switch unit 3, the cost may be reduced when the switch of which state upon getting off is fixed as shown in FIG. 5, for example, the wiring of the washer switch 32 is used as the receiving antenna 8.

In embodiment 1, the remote keyless entry system is the radio wave system, but it may be also realized by a infrared ray system. The remote keyless entry system and the column combination switch are commonly used in the control circuit 4, but they may be also composed independently.

INDUSTRIAL APPLICABILITY

As clear from the description herein, according to the constitution of the invention, the receiving range of signal of the remote keyless entry system can be set wider, and by utilizing the control means of the column combination switch, the individual control means may be commonly used, so that an inexpensive system may be realized.

Description of Reference Numerals

1 Column combination switch main body
2 Light control switch unit
3 Wiper control switch unit
4 Control circuit
5 Memory unit
6 Comparator
7 Converter
8 Receiving antenna
9 Connector
10 Controller
11 Other electric control unit
12 Transmitter main body
13 Signal generator
14 Memory unit
15 Internal power source
16 Transmission circuit
17 Operation switch
18 Automobile main body
19 Column combination switch main body
20 Light control switch unit
21 Wiper control switch unit
22 Control means
23 Connector
24 Receiver main body
25 Power supply unit
26 Memory unit
27 Comparator
28 Control means
29 Receiving unit
30 Door controller
31 Automobile main body
32 Washer switch

What is claimed is:

1. A column combination switch for an automobile, comprising:

a column combination switch body forming at least a portion of the steering column of an automobile, receiving means coupled to said column combination switch body, said receiving means for receiving a signal from a transmitter of a remote keyless entry system, control means for comparing said signal with a specific signal and issuing an opening and closing signal for a door lock, and transmitting means for controlling signals from switches and transmitting to at least one other electric control unit.

2. The column combination switch of claim 1, wherein said control means is used commonly as said column combination switch and said remote keyless entry system.

3. The column combination switch of claim 1, wherein transmitting means of said signal to said other electric control unit is a multiplex transmission system having transmitting and receiving functions.

4. A column combination switch for an automobile, comprising:

receiving means for receiving a signal from a transmitter of a remote keyless entry system, control means for comparing said signal with a specific signal and issuing an opening and closing signal for a door lock, transmitting means for controlling signals from switches and transmitting to at least one other electric control unit, and means for judging that a key is inserted into the key cylinder for engine start.

5. A column combination switch for an automobile, comprising:

receiving means for receiving a signal from a transmitter of a remote keyless entry system, control means for comparing said signal with a specific signal and issuing an opening and closing signal for a door lock, and transmitting means for controlling signals from switches and transmitting to at least one other electric control unit, wherein said receiving means has an antenna, and said antenna is disposed at least in one of the light control switch unit and wiper control switch unit of said column combination switch.

6. The column combination switch of claim 5, wherein said antenna is composed by using the switch wiring installed in any one of the light control switch unit and wiper control switch unit of said column combination switch.

7. A remote keyless entry system for controlling opening and closing of an automobile door, comprising:

a portable transmitter for issuing a door opening or closing signal, a column combination switch main body having a plurality of control switches for controlling the operation of a plurality of electric control units, said column combination switch main body forming at least a portion of the steering column of an automobile, a memory unit storing a specific signal, and a controller for controlling said door opening and closing operation by comparing the opening and closing signal transmitted from said transmitter with said specific signal, wherein said column combination switch is installed in the automobile, and said memory unit and controller are installed in said column combination switch main body.

8. The remote keyless entry system of claim 7, further comprising:

an antenna installed in said automobile, wherein said opening and closing signal transmitted from said transmitter is received in said controller through said antenna.

9. A remote keyless entry system for controlling opening and closing of an automobile door, comprising:

a portable transmitter for issuing a door opening or closing signal, a column combination switch main body having a plurality of control switches for controlling the operation of a plurality of electric control units, a memory unit storing a specific signal, and a controller for controlling said door opening and closing operation by comparing the opening and closing signal transmitted from said transmitter with said specific signal, wherein said column combination switch is installed in the automobile, and said memory unit and controller are installed in said column combination switch main body, wherein said controller further has a function for judging whether a key has been inserted into the key cylinder for engine start or not.

10. A control method for opening or closing an automobile door, comprising the steps of:

(a) issuing a door opening and closing signal from a portable transmitter, (b) transmitting said door opening and closing signal to a memory unit installed in said automobile, in which a column combination switch main body having a plurality of control switches for controlling the operation of a plurality of electric control units is installed at least partially in the steering column of said automobile, and said memory unit is installed in said column combination switch main body, (c) comparing whether said transmission signal coincides with a specific signal stored in said memory unit or not, and (d) controlling said door opening and closing when said transmission signal coincides with said specific signal as a result of said comparison.

11. A control method for opening or closing an automobile door, comprising the steps of:

(a) issuing a door opening and closing signal from a portable transmitter, (b) transmitting said door opening and closing signal to a memory unit installed in said automobile, in which a column combination switch main body having a plurality of control switches for controlling the operation of a plurality of electric control units is installed in said automobile, and said memory unit is installed in said column combination switch main body, (c) comparing whether said transmission signal coincides with a specific signal stored in said memory unit or not, (d) controlling said door opening and closing when said transmission signal coincides with said specific signal as a result of said comparison, and (e) judging whether a key has been inserted into the key cylinder for engine start or not.

12. A control method for opening or closing an automobile door, comprising the steps of:

(a) issuing a door opening and closing signal from a portable transmitter, (b) transmitting said door opening and closing signal to a memory unit installed in said automobile, in which a column combination switch main body having a plurality of control switches for controlling the operation of a plurality of electric control units is installed in said automobile, and said memory unit is installed in said column combination switch main body, (c) comparing whether said transmission signal coincides with a specific signal stored in said memory unit or not, (d) controlling said door opening and closing when said transmission signal coincides with said specific signal as a result of said comparison, (e) judging whether a key has been inserted into the key cylinder for engine start or not, and (f) controlling the operation of at least one of said plurality of electric control units when judged that the key has been inserted into the key cylinder for engine start.

13. The control method of claim 10, wherein said automobile has an antenna, and at said step (b), the opening and closing signal transmitted from said transmitter is received in said memory unit through said antenna.

14. A column combination switch for an automobile, comprising:

a body forming at least a portion of the steering column of an automobile; and a control circuit coupled to said body and configured to receive a signal from a key-less entry transmitter unit and to transmit a signal to a controller of a door lock for locking or unlocking the door lock.

15. The column combination switch of claim 14, wherein said control circuit is further configured to transmit a signal to at least one controller for operating at least one mechanism of the automobile other than said door lock.

16. The column combination switch of claim 15, wherein said at least one mechanism includes at least one of wipers and lights, wherein said wipers and lights are actuated by a wiper control switch unit and a light control switch unit, respectively, that extend from said body.

17. The column combination switch of claim 14, wherein said control circuit transmits said signal to said controller via hard wiring.

18. The column combination switch of claim 14, wherein said control circuit is arranged at a position at least one of on a surface of said body or within said body.

* * * * *